A. DAVIDSON.
VEHICLE SUSPENSION.
APPLICATION FILED NOV. 12, 1919.
1,429,411.
Patented Sept. 19, 1922.
3 SHEETS—SHEET 1.
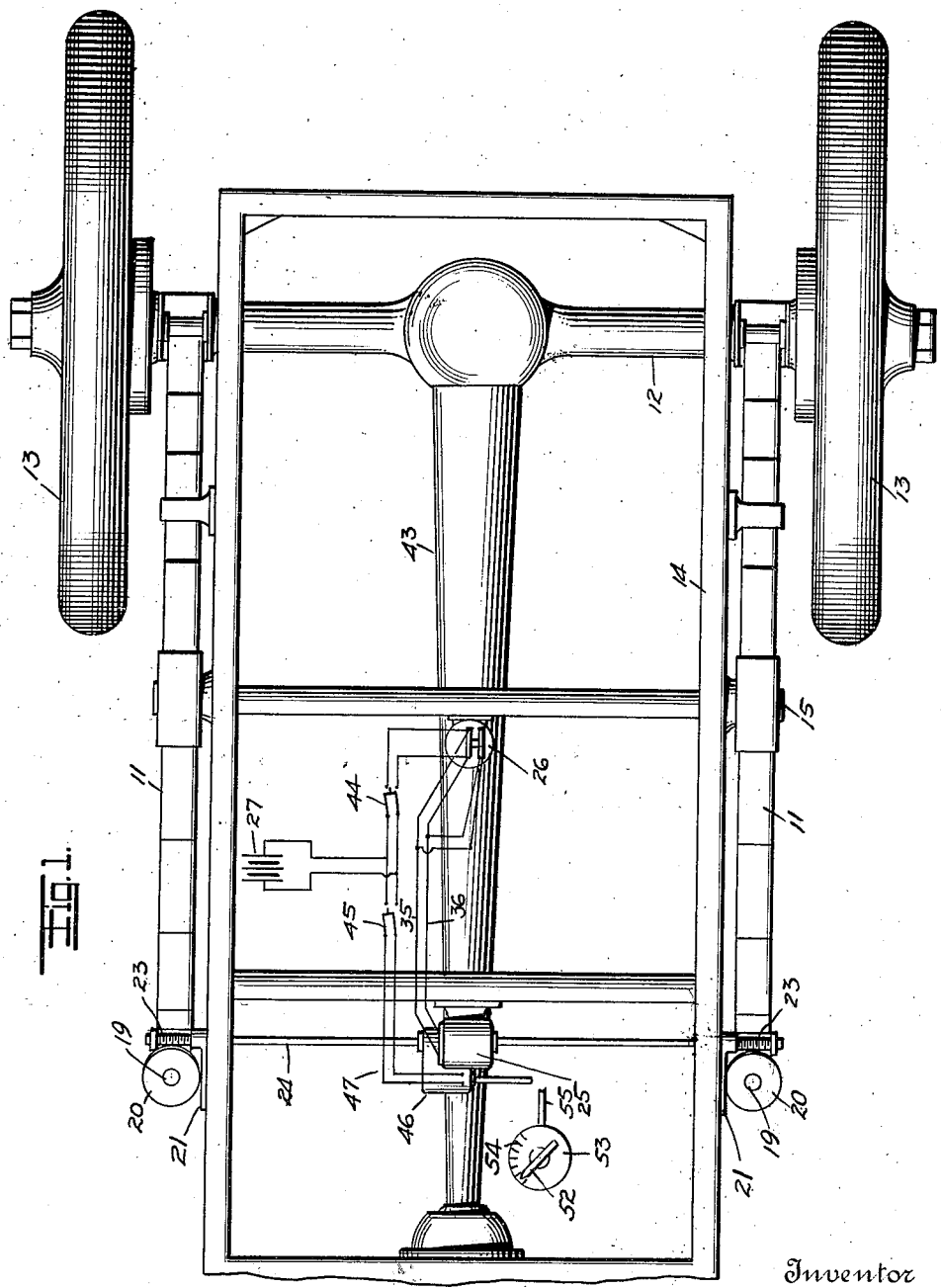
Inventor
ARCHER DAVIDSON
By his Attorney

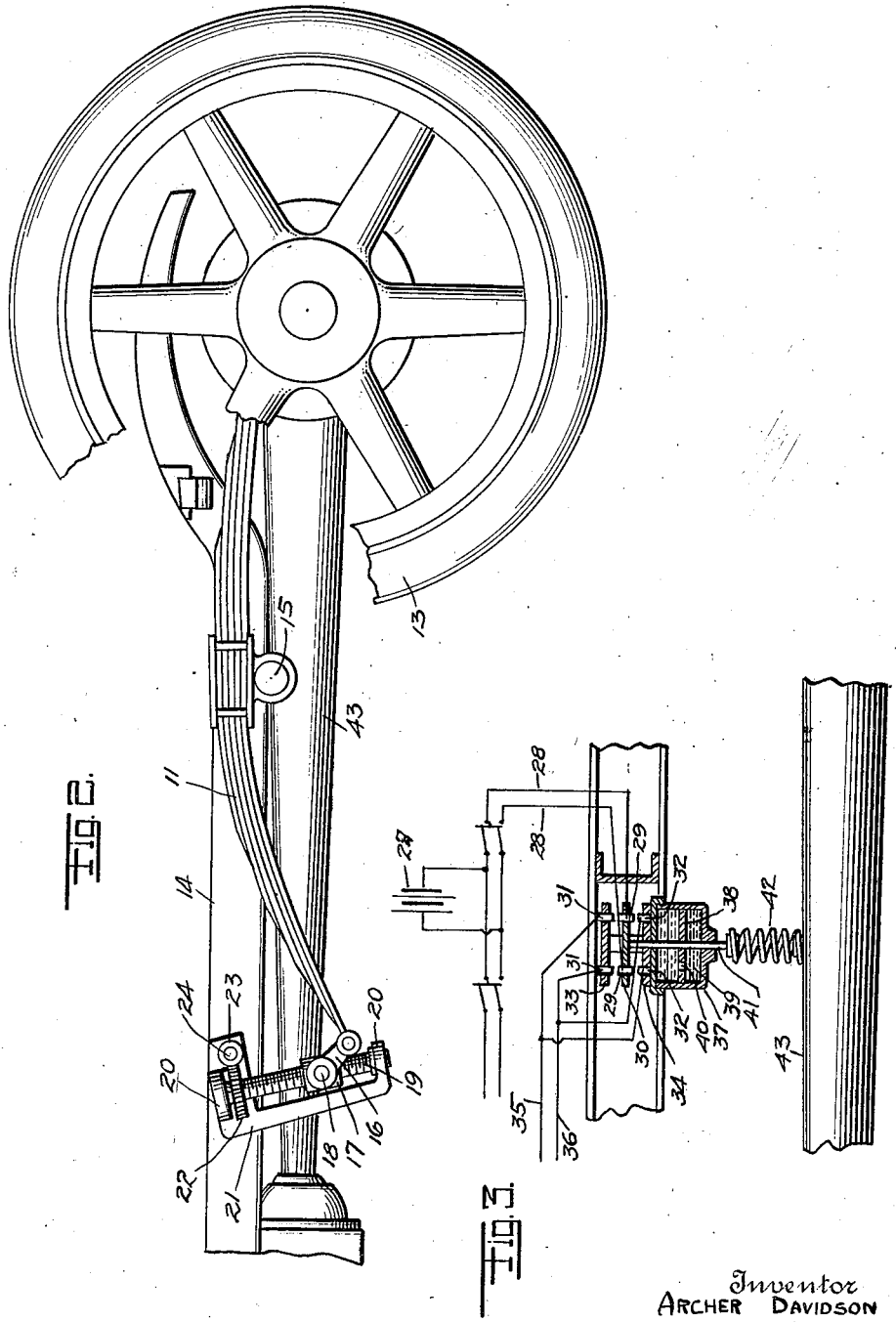

A. DAVIDSON.
VEHICLE SUSPENSION.
APPLICATION FILED NOV. 12, 1919.
1,429,411.
Patented Sept. 19, 1922.
3 SHEETS—SHEET 3.
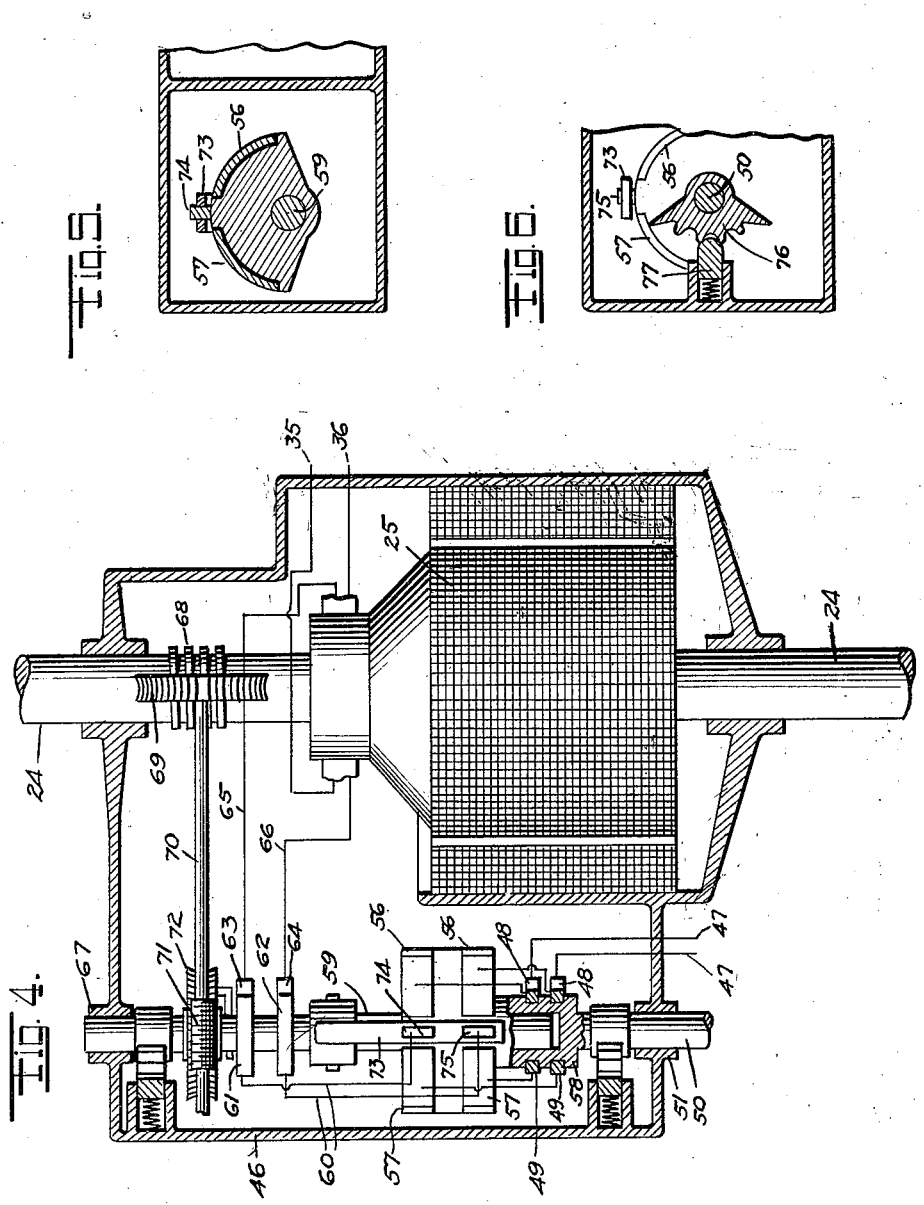
Inventor
ARCHER DAVIDSON
By his Attorney Patented Sept. 19, 1922.

1,429,411

UNITED STATES PATENT OFFICE.

ARCHER DAVIDSON, OF BROOKLINE, MASSACHUSETTS.

VEHICLE SUSPENSION.

Application filed November 12, 1919. Serial No. 337,551.

*To all whom it may concern:*

Be it known that I, ARCHER DAVIDSON, a citizen of the United States, and a resident of Brookline, in the county of Norfolk and State of Massachusetts, have invented certain new and useful Improvements in Vehicle Suspensions, of which the following is a full, clear, and exact description.

Among the principal objects which the present invention has in view are: to employ for variable load-conditions carrying springs designed for a minimum load-condition; to maintain under variable load-conditions the service relation between the body and running gear of a vehicle; to automatically vary the service position of the suspension mechanism in correspondence with the load carried thereby; to vary the suspension relation of carrying springs in correspondence with the variation of the load supported thereon; to differentiate between the transitory and established conditions of the suspension; and to accomplish the various purposes stated by power generated incident to the operation of the vehicle equipped with the suspension, and to simplify the mechanical means for carrying the various purposes into effect.

Drawings.

Figure 1 is a plan view of a rear portion of a vehicle chassis and running gear provided with a suspension mechanism constructed and arranged in accordance with the present invention.

Figure 2 is a side view of the same.

Figure 3 is a detailed view diagrammatically arranged for showing the operation of the automatic mechanism for changing the direction of operation, and for differentiating the established and transitory movements of the running gear and its effect upon the suspension.

Figure 4 is a detail view in plan showing the mechanism controlling the suspension in correspondence with a manually operated adjustment.

Figure 5 is a detail view of a controlling switch for reversing the current flow to the motor for operating the suspension control.

Figure 6 is a detail view showing a method for preventing arcing in the switch members.

Description.

When employing the present invention any of the usual forms of resilient suspension may be used. That illustrated herein is one using springs 11 of the cantilever type. These springs are mounted on the axle 12 of a running gear embodying the wheels 13. The opposite ends of springs 11 support the body frame, being connected therewith by the stud shaft 15 and swinging shackle 16.

As is usual, the resistance of the springs increases as they are flexed by the load on the body, forcing the body downward until the tension of the springs sustains the loaded body. Varying the flexure of the springs by varying the load, or the vibratory movement of the running gear due to irregularities of the roadway, is herein not considered to constitute a change in the disposition or working position of the springs. However, it is obvious that when the load flexes the springs and forces the body downward and with the springs sustaining the loaded body, that if the shackle 16 is elevated and the initial disposition or working position of the springs is thereby changed, the frame 14 and the shaft 15 carried therewith are elevated and the body may be restored to the initial position or a desired position with reference to the running gear.

The result of this co-relation of effects is that when provided with the suspension element herein disclosed, the body of the vehicle and the frame 14 thereof will maintain under different loads the designed normal or desired relation between said body and the axles of the vehicle.

To vary the working position of the shackles 16 each is pivotally mounted on a nut 17, said nut having trunnions 18 forming the pivots for the said shackles. The nuts 17 are operatively mounted on screws 19, the screws 19 being elevated and held in bearings formed in the extensions 20 of the brackets 21. The screws 19 are pivoted in bearings, and are rotated by means of worm wheels 22 that engage worms 23 at the opposite ends of a cross shaft 24. By this means when the shaft 24 is rotated the screws 19 at opposite sides of the vehicle are correspondingly rotated, and the shackles 16 are moved up or down in accordance with the direction of rotation of said screws.

When the screws 19 are rotated to elevate the nuts 17, the service position of the springs 11 is changed, and as above stated, the body of the vehicle is elevated.

To operate the shaft 24 in opposite directions a reversing electric motor 25 is used. The motor 25 is properly connected with the shaft 24, to rotate the said shaft at the desired rate. To this end any suitable reducing gears are employed.

It is desirable to actuate the motor 25 and to control the current flow therefor automatically. To this end a double throw switch 26 is employed, and is interposed between an electric source, such as the battery 27 and the said motor.

As seen best in Fig. 3 of the drawings the battery leads 28 are electrically connected to contactors 29 on the movable switch head 30. The contactors 29 are aligned with, to engage the contactors 31 and 32 on the stationary switch heads 33 and 34. The contactors 31 and 32 are electrically connected with the motor leads 35 and 36, but in a relatively reverse arrangement. That is to say, the contactor 31 at the right hand side of said figure is connected to the lead 35, while the contactor 32, at the right hand side of the figure, is connected to the lead 36. The direct result of this is that the contactor 29, at the right of the shackle, which is connected by the lead 28 with the negative side of the battery, when moved into engagement with the contactor 31, is electrically in circuit with the lead 35, and when moved into engagement with the opposite contactor 32, it is in circuit with the lead 36.

The same reverse occurring on the other contactors, it is obvious that the current flow to the motor is reversed as the contactors 29 engage the contactors 31, and 32, successively. It is obvious that as the flow of current is reversed in the motor, the rotation of the motor is reversed, with the result that the shaft 24 and the worms 23 thereon are correspondingly reversed, and the shackles 16 are elevated or depressed as the case may be.

To prevent the operation of the mechanism for varying the shackles 16, as a result of the vibration of the parts of the vehicle incident to travel on bad roads, I provide an action retarding member in the shape of a dashpot 37, in which a piston 38 moves in a liquid 39. The liquid 39 is preferably oil more or less heavy as the case may be, which flows through the aperture 40 in the piston 38 as the same is carried from end to end of the cylinder of the dashpot.

The piston 38 is fixedly mounted on the stem 41, upon which also is mounted fixedly the switch head 30. Therefore, the switch head 30 moves with the piston 38 and the stem 41. The stem 41 is operatively connected with a spring 42, that is fastened on the housing 43 of the propeller shaft of the vehicle, and moves up and down with the running gear.

The spring 42 is sufficiently flexible to permit the vibration of the running gear and housing 43 thereof, without moving the piston 38 in the retarding fluid sufficiently to engage the contactors 29, 31 and 32. If, however, the displacement of the spring 42 is continued, it moves the piston 38 through the fluid 39, and the switch head 30 is carried from its median position to engage the contactors 29 thereon with the contactors 31 or 32 as the case may be.

If the vehicle has been loaded to the extent that the spring 42 is compressed, the switch head 30 is moved upward, and the motor actuating circuit is completed through the contactors 29 and 31, with the result that the motor drives the shaft 24 and worms 23 connected therewith to revolve the screws 19 to elevate the shackles 16, thereby lifting the body of the vehicle and relieving the pressure on the spring 42.

When the pressure on the spring 42 is relieved sufficient for the spring to withdraw the switch head 30 and contactors 29 from engagement with the contactors 31, the current flow is broken, and the vehicle suspension is maintained in the position to which the body has been raised, which position it will be observed is the normal or designed relation of the body and the running gear of the vehicle.

If now the load be lightened, the springs 11 lift the body and move the switch head 34 and contactors 32 into engagement with the contactors 29. This arrangement supplies current to the motor, the flow being the reverse of that previously delivered, with the result that the motor 25 is reversed and the shackles 16 and parts connected therewith are depressed.

The motor continues to operate until the relaxation of the springs 11 permits the body to settle until the contactors 32 pass from engagement with the contactors 29. Again the vehicle will be found in its normal or designed position with regard to the separation of the body and the running gear.

At times it is desired to manually and selectively arrange the working position of the suspension. To accomplish this the use of the switch 26 is discontinued by throwing the line switch 44 to disconnect said switch from the battery 27. By closing the switch 45, a manually adjusted switch mechanism, mounted in housing 46, is operated. This mechanism is seen best in Fig. 4 of the drawings.

Current is supplied by the leads 47 to the brushes 48. The brushes 48 are fixed in position to contact with the collector rings 49. The rings 49 are mounted on the shaft 50, to rotate therewith. The shaft 50 is rocked in its bearings 51 in the housing 46 in correspondence with the movement of a pointer 52 on the gage dial 53. The dial 53 has a series of calibrations 54 graved thereon, to indicate the service arrangement of the springs 11.

The dial 53 is disposed in any convenient position, and a pointer 52 thereon is operatively connected with the shaft 50 by a transmission shaft 55.

Two contact sectors 56 and 57 are mounted on the enlarged tubular extension 58, at the inner end of the shaft 50. The sectors 56 and 57 are disposed in pairs at opposite sides of the shafts 50 and 59. The members of the paired sectors are electrically connected with the rings 49 but in a reverse manner. That is to say, the sectors 56 are connected, the lower member thereof with the lower ring 49, reference being had to Fig. 4 of the drawings, while the upper sector 57 is connected to the same ring. From this arrangement it will be seen that when the current is transmitted from the leads 47 to the leads 60, through the rings 49 and sectors 56 and 57, the current flow will vary, that passing through the sectors 57 being the reverse of that which is delivered through the sectors 56. As the current is delivered by the leads 60 to the collector rings 61 and 62, and stationary brushes 63, 64, the current delivered through the wires 65, 66 to the motor 25 will correspond with the sectors 56 or 57 which are in service.

The shaft 59 is mounted on bearings formed in the tubular extension 58, and in the journal 67 of the housing 46. The shaft 59 is driven by the motor 25, through a transmission gear embodying the worm 68, on the shaft 24, the worm wheel 69 on the transmission shaft 70, the worm 71 on the transmission shaft 70, and the worm wheel 72 on the shaft 59.

Fixedly mounted on the shaft 59 and extended therefrom, is an arm 73, which is provided with contact brushes 74 and 75. The brushes 74 and 75 are arranged to make contact with the sectors 56, 56 and 57, 57. The said brushes 74, 75, constitute the line terminals of the leads 60.

When the vehicle is equipped with the switch mechanism just described, the operation is as follows: Desiring to manually arrange his car for the carrying of a load different from that for which the car was previously adjusted, the driver opens the switch 44 to cut out the switch 26, and closes the switch 45 to deliver current through the wires 47 to the sectors 56, 57. The driver then moves the pointer 52 over the calibrations 54 to the station indicating the desired working position or arrangement of the springs for the operation of the vehicle.

When the pointer 52 is moved, the shaft 50 is rocked, with the result that one or other of the pairs of sectors 56 or 57 is moved to engage the contact brushes 74, 75. Current is thereby delivered to the motor 25, the flow whereof is in correspondence with the sectors 56 or 57 contacting with the contact brushes 74 and 75. Whichever it is, the motor 25 in starting rotates the shaft 24 and through the worms 23 the screws 19 are rotated to raise or lower the nut 17 and the shackle 16 therewith. At the same time, through the transmission mechanism incorporating the worms 68 and 71, and the worm wheels 69 and 72, the shaft 59 is rotated toward the gap between the sectors 56 and 57, with the result that the contact brushes 74 and 75 are carried out of engagement with the sectors with which they have been engaged. When the contact brushes 74 and 75 pass into the said gap, the circuit is broken and the motor 25 is arrested.

From the foregoing it will be seen that the gap between the sectors 56 and the sectors 57 corresponds in position with the indication of the pointer 52. It is also evident that by placing the said gap in different positions, the nut 17 and shackle 16 connected therewith may be disposed in position to vary the service arrangement of the springs 11.

As seen best in Fig. 6 of the drawings, a locking sector 76 is mounted on the shaft 50, to prevent the accidental rotation thereof. The teeth on the edge of the sector 76 are operatively engaged by the spring seated detent 77. It will be understood that while this arrangement is preferred, there are many suitable devices for accomplishing this purpose.

From the foregoing it is obvious that a vehicle may be constructed with very flexible springs to insure comfortable riding and the correct positioning of the body with proper service relation to the running gear under varying loads.

Under usual conditions, the range of variation in the load would be fully taken care of by the automatic governor embodying the switch 26.

Also it is obvious that if the operator for any reason desires to cut out the automatic governor or switch 26, he can do this and himself re-dispose the vehicle to a load determined by him. Or he may vary the operating condition of the suspension to accommodate the vehicle to roads over which he may be traveling or contemplate traveling. In both events the service position of the carrying springs is varied to obtain the correct positioning of the body with relation to the running gear.

*Claims.*

1. A suspension as characterized comprising, a plurality of carrying springs operatively connecting the running gear and body of the vehicle; and means for maintaining constant the service relation of the body and running gear of said vehicle, said means embodying electrically actuated means having a prime mover for changing the service normal tension of said springs in correspondence with the carried load on said body.

2. A suspension as characterized comprising, a plurality of carrying springs operatively connecting the running gear and body of a vehicle; and means for varying the service arrangement of said springs, said means embodying a reversible prime mover and transmission mechanism connecting the same with said springs for changing the service normal tension of said springs in correspondence with the carried load on said body.

3. A suspension as characterized comprising, a plurality of carrying springs operatively connecting the running gear and body of a vehicle; means for varying the service arrangement of said springs, said means embodying a reversible prime mover and transmission mechanism connecting the same with said springs for changing the service tension of said springs; and means for actuating said prime mover, said means operating in correspondence with the carried load on the body of said vehicle.

4. A suspension as characterized comprising, a plurality of carrying springs operatively connecting the running gear and body of a vehicle; means for varying the service arrangement of said springs, said means embodying an electric reversible motor and transmission mechanism connecting the same with said springs for changing the service tension of said springs; means for automatically operating said motor, said means being operated in correspondence with the carried load on the body of said vehicle; and means for preventing the operation of said electric motor by any unsustained movement of said body.

5. A suspension as characterized comprising, a plurality of carrying springs operatively connecting the running gear and body of a vehicle; means for varying the service arrangement of said springs, said means embodying a reversible electric motor and transmission mechanism connecting the same with said springs for changing the service tension of said springs; means for automatically operating said motor, said means operating in correspondence with the carried load of the body of said vehicle; and means for preventing the operation of said electric motor by any unsustained movement of said body, said means embodying a switch attached to said body, a yielding member for actuating said switch when the relation of said body and the running gear of the vehicle varies, and a slow moving governor interposed between said yielding member and said switch for in turn yielding to the force applied by said yielding member when said force is sustained.

6. A suspension as characterized comprising, a plurality of carrying springs; a plurality of suspension shackles, screws for elevating and depressing said shackles, an electric motor operatively connected with said screws for rotating the same to vary the working position of said shackles, an electric source embodying a switch, and means operatively connecting the same with the body and running gear of a vehicle to be operated in correspondence with the service relation thereof.

7. A suspension as characterized comprising, a plurality of carrying springs; a plurality of suspension shackles, screws for elevating and depressing said shackles, an electric motor operatively connected with said screws for rotating the same to vary the working position of said shackles, an electric source embodying a switch, means operatively connecting the same with the body and running gear of a vehicle to be operated in correspondence with the service relation thereof; and a brake mechanism for retarding the action of said switch.

8. In a vehicle having an available power supply, metal body supporting springs disposed between the body and running gear of said vehicle; and means operable by said power supply and embodying a reversible motor integral with transmission mechanisms connecting said motor to said springs to vary the disposition of said springs.

9. In a vehicle having an available power supply, metal body supporting springs disposed between the body and running gear of said vehicle; and means operable by said power supply and embodying a reversible power receiving means integral with transmission mechanisms connecting said power receiving means to said springs for varying the service arrangement of said springs.

10. A suspension as characterized comprising a plurality of carrying springs supportingly attached to the running gear and body of the vehicle; a power supply; and reversible power receiving means operatively connected to said springs, said means being operable in reverse directions by said power supply for varying the initial disposition of said springs.

11. In a vehicle having an available power supply, body supporting springs disposed between the body and running gear of said vehicle, means operable by said power supply for varying the service arrangement of said springs; and means operatively connected between said vehicle body and running gear for automatically controlling the power supply to said springs for maintaining approximately constant the service relation of said vehicle body and running gear.

12. In a vehicle having an available power supply, power varied metal body supporting springs disposed between the body and running gear of said vehicle; and means operatively disposed between said vehicle body and running gear to cause the power from said power supply to said power varied springs to be discontinued when said vehicle body and said running gear move into a predetermined relation.

13. In a vehicle having power varied metal body supporting springs disposed between the body and running gear of said vehicle, means for controlling the power supply to said power varied springs, said means being mounted on said vehicle body; and resilient means operatively disposed between said power controlling means and said vehicle running gear to operate said power controlling means.

14. In a vehicle having power varied metal body supporting springs disposed between the body and running gear of said vehicle, means for controlling the power supply to said springs, said means being mounted on said vehicle body, resilient means operatively disposed between said power controlling means and said vehicle running gear to operate said power controlling means; and a retarding mechanism to slow the movement of said power controlling means.

15. In a vehicle having an available power supply, metal body supporting springs disposed between the body and running gear of said vehicle; means operable by said power supply, embodying a reversible power receiving means integral with transmission mechanisms connecting said power receiving means to said springs to vary the disposition of said springs; and means to direct the power supply to said power receiving means to operate said power receiving means in reverse directions.

16. In a vehicle having an available power supply, metal body supporting springs disposed between the body and running gear of said vehicle, means operable by said power supply, embodying a reversible power receiving means integral with transmission mechanisms connecting said power receiving means to said springs to vary the disposition of said springs, means to direct the power supply to said power receiving means to operate said power receiving means in reverse directions; and means operated in correspondence with said power receiving means whereby the power from said power supply is discontinued when said springs are disposed in a predetermined position.

17. A suspension as characterized comprising a vehicle having a load carrying body and a running gear therefor, and shackles connecting said body and carrying springs; and means operable by said body and running gear for varying the length of said shackles in correspondence with the carried load in said body.

18. In a vehicle having vehicle suspension instrumentalities, an electric motor and transmission mechanisms operatively connecting said motor to said suspension instrumentalities; means for controlling the operation of said motor for varying the relations between said suspension instrumentalities and said vehicle.

19. In a vehicle having a power supply, metal vehicle suspension members, and a prime mover with transmission mechanisms operatively connecting said prime mover to said suspension members, said prime mover being operable by said power supply; means for connecting said prime mover to said power supply for varying the relations between said suspension members and said vehicle; and means for automatically disconnecting said prime mover from said power supply when said suspension members move into a predetermined position.

20. In a vehicle having, vehicle suspension instrumentalities, a power supply, and an electric motor with transmission mechanisms operatively connecting said motor to said suspension instrumentalities, said motor being operable by said power supply; means for connecting said motor to said power supply for varying the relations between said suspension instrumentalities and said vehicle; and means for automatically disconnecting said motor from said power supply when said suspension instrumentalities move into a predetermined service arrangement.

21. In a vehicle having an available electric power supply; electrically varied vehicle suspension instrumentalities disposed between the body and running gear of said vehicle; and means operatively disposed between said vehicle body and said running gear for controlling the electric power supply to said electrically varied vehicle suspension instrumentalities.

ARCHER DAVIDSON.